United States Patent [19]
Jones, Jr.

[11] Patent Number: 5,175,863
[45] Date of Patent: Dec. 29, 1992

[54] SIGNAL DATA PROCESSING SYSTEM HAVING INDEPENDENTLY, SIMULTANEOUSLY OPERABLE ALU AND MACU

[75] Inventor: Gardner D. Jones, Jr., Raleigh, N.C.

[73] Assignee: International Business Machines Corporation, Armonk, N.Y.

[21] Appl. No.: 425,150

[22] Filed: Oct. 23, 1989

[51] Int. Cl.⁵ .................... G06F 3/05; G06F 9/06; G06F 13/36; G06F 9/302

[52] U.S. Cl. .................... 395/800; 364/221.4; 364/229.5; 364/234.1; 364/238.6; 364/239; 364/240; 364/245; 364/246.3; 364/243.3; 364/243.7; 364/247; 364/247.1; 364/247.8; 364/255.8; 364/256.8; 364/258.1; 364/258.2; 364/258; 364/260; 364/DIG. 1

[58] Field of Search ............ 395/275, 375, 800, 400, 395/425, 500, 725, 250; 364/715.06

[56] References Cited

U.S. PATENT DOCUMENTS

| | | | |
|---|---|---|---|
| 4,713,749 | 12/1987 | Magar et al. | 395/375 |
| 4,862,392 | 8/1989 | Steiner | 395/127 |
| 4,885,684 | 12/1989 | Austin et al. | 395/275 |
| 4,920,480 | 4/1990 | Murakami et al. | 395/800 |
| 4,928,223 | 5/1990 | Dao et al. | 395/375 |
| 4,949,250 | 8/1990 | Bhandarkar et al. | 395/375 |
| 4,955,024 | 9/1990 | Pfeiffer et al. | 371/40.1 |
| 5,045,993 | 9/1991 | Murakami et al. | 395/375 |
| 5,072,418 | 12/1991 | Boutaud et al. | 364/715.06 |

FOREIGN PATENT DOCUMENTS 0171595 2/1986 European Pat. Off. .

OTHER PUBLICATIONS

IEEE Micro, vol. 8, No. 6+IN, Dec. 1988, New York, NY, pp. 49-67, "A Digital Signal Processor with IEEE Floating-Point Arithmetic" by G. R. L. Sohie and Kevin L. Kloker.

Philips Technical Review, vol. 44, No. 1, Mar. 1988, Eindhoven, The Netherlands, pp. 1-14, "Developments in Integrated Digital Signal Processors, and the PCB 5010" by J. L. van Meerbergen.

IBM Technical Disclosure Bulletin, vol. 31, No. 12, May 1989, Armonk, NY, pp. 390-391, "Signal Processor Hardware Architecture for Optimum Instruction Efficiency".

IEEE Micro, vol. 8, No. 6+IN, Dec. 1988, New York, NY, pp. 30-47, "The DSP32C: AT&T's Second-Generation Floating-Point Digital Signal Processor" by M. L. Fuccio et al.

*Primary Examiner*—Thomas C. Lee
*Assistant Examiner*—Daniel H. Pan
*Attorney, Agent, or Firm*—Edward H. Duffield

[57] ABSTRACT

The architecture operates the ALU and MACU through a register file that serves as a general buffer pool for operands. All operands transfers take place between data memory through this register file. The ALU and MACU have equal access to all data in the file. Further the file is the buffer for previous ALU results. In this manner, the bandwidths of all the individual units, data buses, ALU and MACU can be fully utilized without conflicts. In general, the proposed configuration relies on the redundancy or latency in many signal processing computations where data and results are used and reused in the overall computation and must remain in holding registers. The register file gives this capability providing these operands for use independently by both the ALU and MACU. Without a common register file, operands would have to be reloaded as the computation continues. These redundant loads reduce the throughput for the computation.

9 Claims, 7 Drawing Sheets

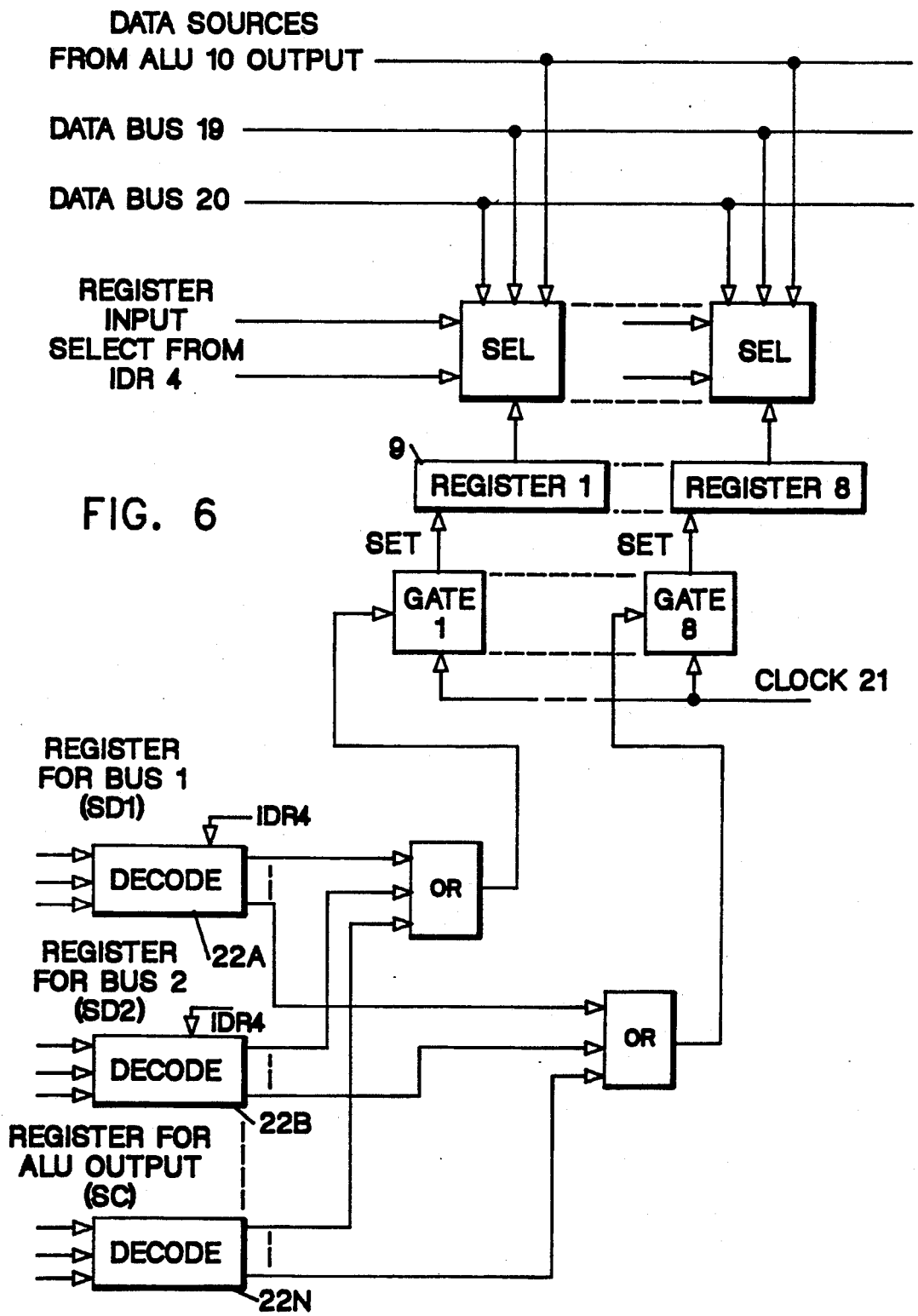

SIGNAL DATA PROCESSING SYSTEM HAVING INDEPENDENTLY, SIMULTANEOUSLY OPERABLE ALU AND MACU

FIELD OF THE INVENTION

The invention relates to data processing systems in general and particularly to digital signal processing computers adapted for performing rapid, repetitive calculations for Fourier transformations, digital filters, compression coding, correlation, equalization, modem functions, speech recognition synthesis or compression and image recognition or enhancement as well as instrumentation and filtering.

PRIOR ART

A variety of commercially available, high speed signal processors currently exists. For example, my own previous patent application Ser. No. 723,991 filed Apr. 15, 1985 now U.S. Pat. No. 4,794,517 describes a three-phased pipelined signal processor architecture.

This architecture is capable of numerous high speed operations and does have a separate arithmetic and logic unit (ALU) as well as a separate multiplying function. However, the multiplier in this prior patent does not have accumulator registers or dual data bus structure that would permit independent and simultaneously concurrent operation of the ALU and multiply accumulate functions.

Similarly, VanWijk et al have described a digital signal processor with parallel processing capability in an article entitled "A Two Micrometer C Moss 8 MIPS Digital Processor with Parallel Processing Capability" appearing in the IEEE Journal of Solid State Circuits, Volume SC-21, Number 5, October 1986, page 750 et seq.

This processor does exhibit separate MACU and ALU units but concurrent operation of the ALU and MACU with high rate of memory transfer functions is not possible because of the bus and register configuration employed. When two operands must be transferred from data memory to the ALU via the X and Y buses, the MACU is prevented from having any input either from memory or from the ALU because the data buses are occupied with the operand transfers to the ALU. A simple simultaneously concurrent operation such as the adding of two operands by the ALU and multiplication of the result by a third operand in the MACU cannot be performed because no transfer paths are available to operate the MACU. Such a configuration requires an additional machine cycle to take the results from the ALU output registers, transfer them via data buses and place them in input registers of the MACU for the multiplication step. Such an architecture does operate the ALU or the MACU independently but they may not be operated simultaneously or concurrently. This architecture thus achieves no performance gain from the separation of the two functions of the ALU and MACU.

Another commercially available signal processor having a separate ALU and MACU is the Analog Devices processor described in the Analog Devices Users Manual E971-10-4/1986. This architecture operates the ALU and MACU separately but not concurrently. This architecture does have an additional result bus for transfer of previous results between the ALU and the MACU without blocking the data buses. However, only the previous result from either the MACU or the ALU can be transferred across the result bus in this manner, and it provides only a single result operand to the other unit, but not two operands. When two operands are transferred to the ALU via data buses, the output of the ALU can provide one input to the MACU. The other operand must have been loaded in a MACU input register previously either from data buses or from the ALU. The limited utility that this configuration offers for simultaneous operation is probably the reason that the vendor provides no capability in the instructions for carrying out simultaneous operations. The ALU and the MACU are operated separately and independently, but not concurrently. Thus no performance gain is achieved by the configuration. Even if a more general routing capability were provided between the ALU and the MACU for both of the foregoing vendor architectures, they would still not achieve the maximum possible throughput that separating the processing functions themselves can offer because both of these prior ALU and the MACU devices have separate input register files. In both of these architectures, therefore, the processing units ALU and MACU do not have common access to the operands once they are transferred from data memory. To have common access to the operands, the operand must be loaded in parallel into input registers in both the ALU and the MACU or an additional machine cycle must be taken to perform the transfers.

OBJECTS OF THE INVENTION

In light of the foregoing known difficulties with the prior art signal processors and their architecture, it is an object of the present invention to provide an improved signal processor having independently and simultaneously operable ALU and MACU units.

BRIEF SUMMARY

The improved signal processor in the present invention permits simultaneous operation of the ALU and MACU by providing a register file that serves as a general buffer or pool for operands. All operand transfers take place between separate data memories through two separate buses into the register file or out of the file into the memories. The ALU and MACU have equal access to all the data in the file at any time. The file also serves as a buffer for any previous ALU results. It is not necessary to have the output of the MACU available in the register file because the ALU performs operations for results on a single operation basis and the output from the MACU will be available for each operation of the ALU if required. In contrast, the MACU may take many operations to produce a meaningful result. The register file gives the capability of providing operands for use independently by both the ALU and the MACU, without which operands would have to be reloaded as the computation continues, thereby causing a redundant transfer load that will reduce the throughput of computation. In order to avoid reloading of operands, operations in the ALU must be possible in the form of R=A as a function of B. in this form, a third operand the result R, is generated without destroying either of the input operands. This may be contrasted with the conventional operations of the form A=A as a function of B in which one of the input operands, A, is replaced by a new result A. The significance of the improved instruction form is that it eliminates reloading an erased operand for use by a subsequent operation within a few cycles which would cause extra data bus conflicts and reduce the throughput. Independent and concurrent operation of the ALU and MACU require that instructions calling for the improved mode of operation must have separate control fields for each unit as well as control fields for the register file input and outputs.

BRIEF DESCRIPTION OF DRAWINGS

The invention will be described with reference to a preferred embodiment which is further illustrated in the drawings in which:

FIG. 6 illustrates input selection for the registers in the register file together with the selection and decode logic.

DESCRIPTION OF PREFERRED EMBODIMENT

Signal processors are well known as is apparent from my own aforementioned prior art patent U.S. Pat. No. 4,794,517 and the references listed therein and from the above-identified prior art which represent commercially available digital signal processors. Most of the general principles of construction, the details of ALU and MACU and data memory structure and controls for address generation, instruction decoding and the like are readily known and available circuits and structures that are not, in themselves, a part of the present invention.

The present invention is directed to the architecture of separately and simultaneously operable ALU and MACU units together with a register file serving as a buffer pool for all data transfers to and from memory and the operative ALU and MACU units. Therefore, the degree of detail for such elements as a sequencer for instruction addresses for instruction fetching, the details of instruction decode logic or address generation, etc. are not given herein as such details are readily available from any of the prior art references and are well understood by those of skill in the art. It is the arrangement of the basic operable elements and their interconnection and control that forms the basis of the presently claimed invention and that is the area to which this detailed description is directed.

Figure 1:
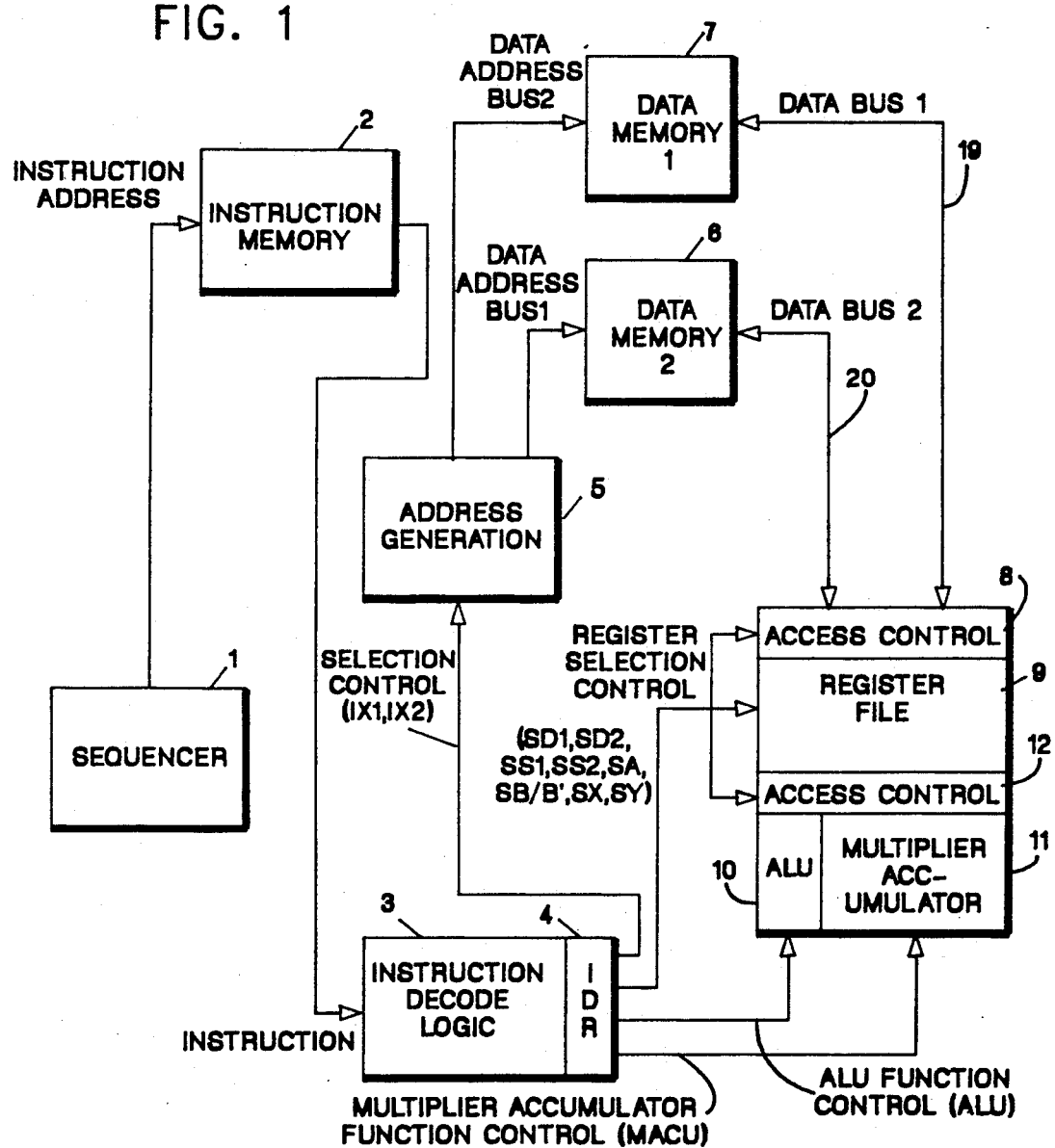
FIG. 1 illustrates a high level schematic flow diagram of the main operational portions and their interconnection in constructing a signal processor having separate, independently and simultaneously operable ALU and MACU units.

Turning to FIG. 1, the overall schematic layout of the operative units constituting a signal processor having independently and simultaneously operable ALU and MACU is shown.

The sequencer 1 steps the instruction memory 2 through a list of preloaded instructions to provide them individually when required or "fetched" to the instruction decode logic 3. Incoming instructions are decoded and the results loaded into an instruction decode register, IDR 4. Various output control lines exit from the IDR 4 to set the function of the ALU and the MACU and to control I/O access of data and operands to and from the register file 9 via the access control logic 8 and 12. IDR 4 controls the ALU 10 and MACU 11 as well as register file 9 and the access control 8 and 12, respectively. A selection control line pair goes to the address generators 5 which provide data address inputs on data address buses 1 and 2 into the data memories 6 and 7, respectively. The data memories 6 and 7 provide their output data on buses 19 and 20 as shown on FIG. 1 to the access control 8 to gain entrance to or exit from register file 9. The construction of all of these units in FIG. 1 is a matter well known in the prior art and details of the construction of the elements themselves, with the exception of some of the details for the register selection control means 8, 12, the IDR 4 and the address generation 5, is therefore not given.

Figure 2:
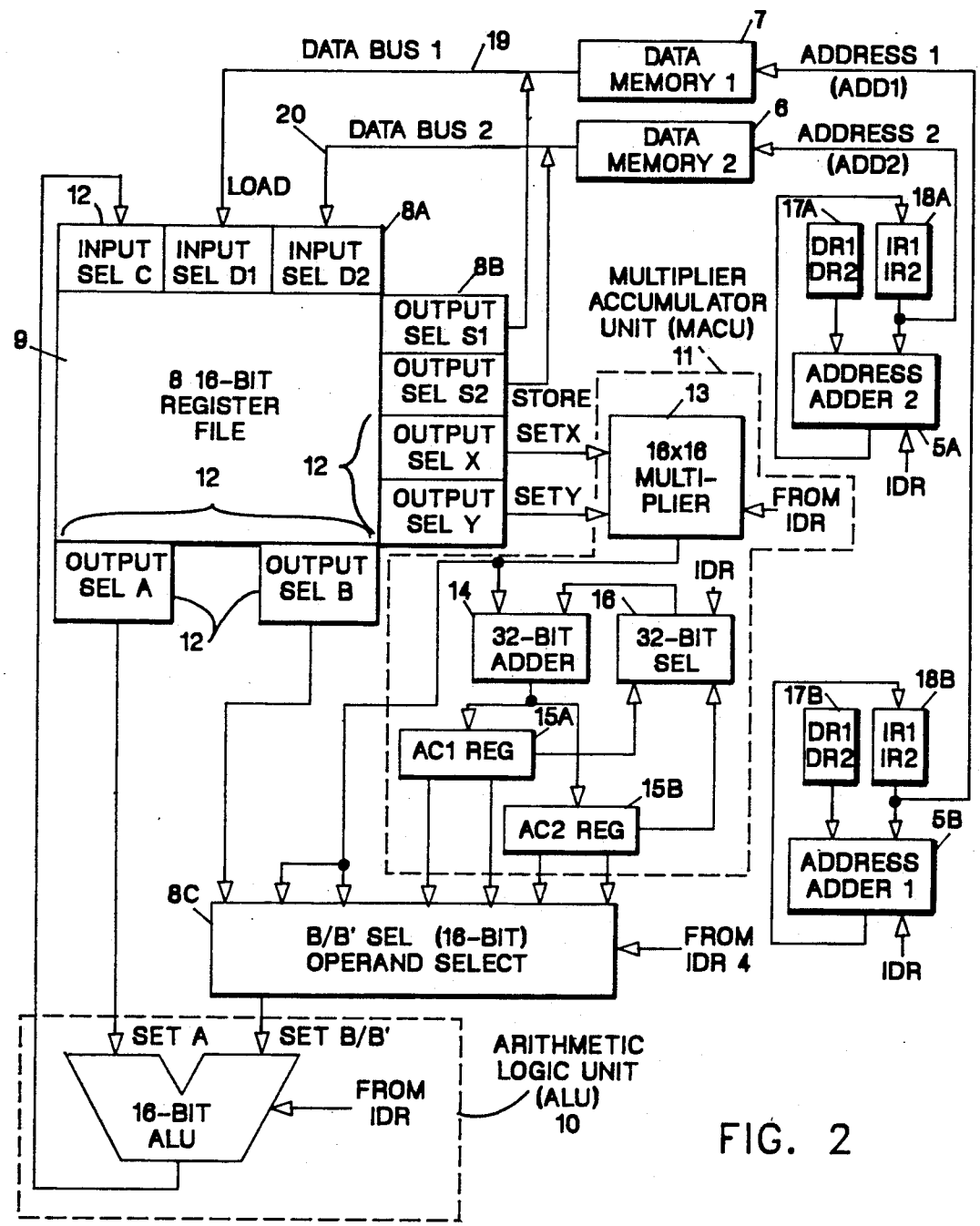
FIG. 2 illustrates that portion of an improved signal processor in greater detail showing the interconnection of the ALU and MACU to the register file and the separate address generation and data memory paths as utilized in the preferred embodiment.

Turning to FIG. 2, a more detailed representation of the major components of the group comprising the register file 9 and the separate ALU and MACU 10 and 11, respectively, together with the dual data memory and address bus structure as well as the dual address generation structure for the data memories are depicted with the input control lines and clocking omitted for clarity. It may be observed that the data memories 6 and 7 are individually driven by their address generators 5A and 5B and provide independent outputs on the data buses 19 and 20 to the register file input control means for loading 8A or to the control 8B for reading from the register file. Additionally, outputs from the register file may be selected as an operand via the output control 12 or the output of the ALU may be selected through another portion of the control 12 for input to the register file 9. Output control 8C controls the selection of either the output selection B or B'. Output B' can be the output of the multiplier 13 or of either of the multiplier accumulator registers 15A and 15B as controlled by the output from the IDR 4 through the selector 8C which acts as the access control means for this portion of the operand selection. It may be seen that the output from the register file 9 may be selected for input to the ALU 10 and that either another output from register file 9 or the result of the multiplier 13 or some addition or subtraction result which appears in the accumulator registers 15A or 15B may be selected as the operand B or B' for the other input to the ALU 10. The operand selection for B or B' is via operand register file access control SC under the control of IDR 4 as will appear in greater detail later.

It may be noted that the multiplier 13 provides an output to a 32-bit adder 14 whose input is also received from a 32-bit selector 16 under control of the IDR for recirculating the content of the accumulation register 15B for further mathematical operations in the adder 14, again under the control of the IDR. Separate multiplication and accumulation results may therefore be stored separately in the registers 15A and 15B depending upon selection signals from the IDR (not shown).

Also the address generation logic for the two data memories 6 and 7 are separate and independent. The address generator 5B generates an address for data memory 7 and has separate incrementation and displacement registers 18B and 17B, respectively, which may be utilized in generating the addresses for the data memory 7. A similar structure exists separately for the address generator 5A together with its separate displacement register 17A and incrementation register 18A. It provides addresses to the data memory 6. The independent data memories with their independent address generators provide independently their results or output on the data buses 19 and 20, respectively. Thus, on any clock cycle, two operands from data memories 6 and 7 may be simultaneously presented to the register file 9 or two outputs from register file 9 may be selected for input to the data memory or recirculation back into the register file. At the same time two separate outputs X and Y may be selected for input to the MACU, two outputs may be selected for input to the ALU and an input from the ALU may be selected for simultaneous input to the register file.

Figure 3A:
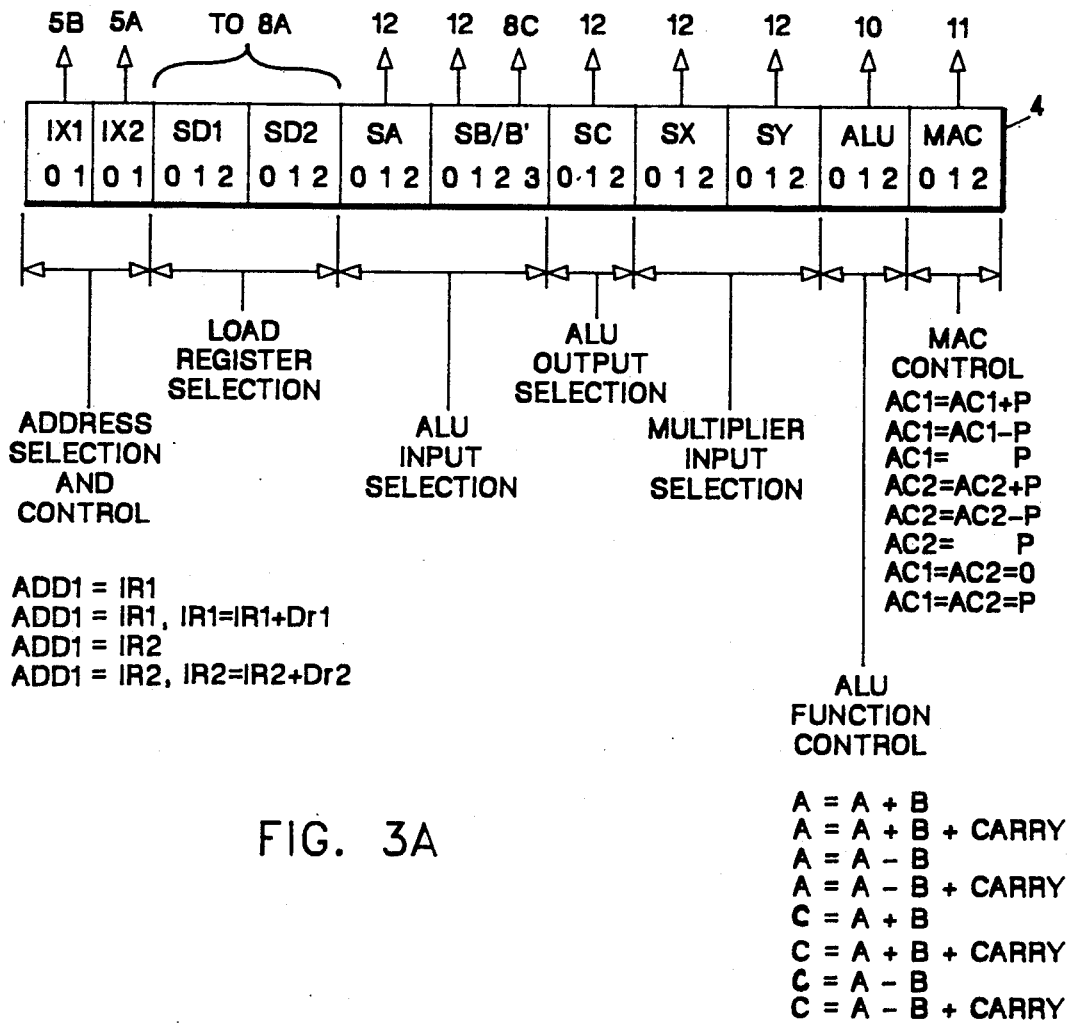
FIG. 3A illustrates a typical instruction decode register format for a load and compute operation.

FIG. 3A illustrates a typical instruction decode register (IDR) 4 content for an eight-register file 9 for a load and compute operation. The assignments of the control fields in the IDR 4 and the functions that may be selected are shown in FIG. 3A. It may be observed that the ALU control function includes some functions of the form C=A function of B in which the result of the ALU output is stored in a new register C without destroying either of the original input operands A or B.

The field for address selection and control can use either the incrementation register or the incrementation register plus a fixed displacement that may be selected between two different values or two different incrementations depending upon the selection control code.

The MACU control field contains eight possible specified operations of the form as shown.

Figure 3B:
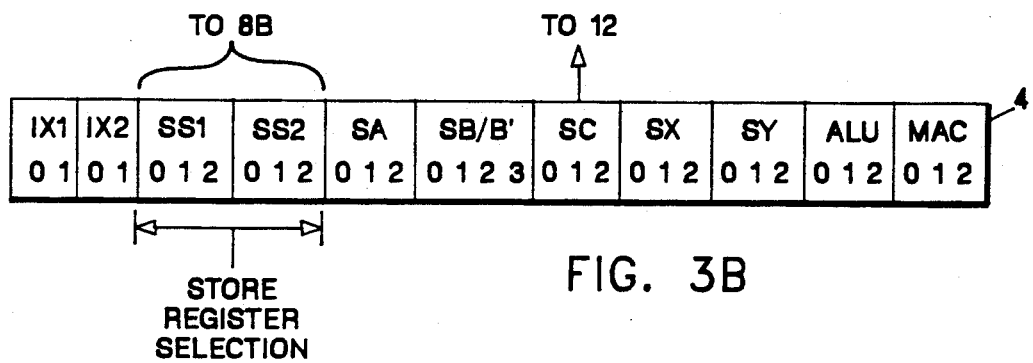
FIG. 3B shows a typical instruction decode register format for a store and compute operation.

FIG. 3B shows the typical instruction decode register content for an eight register file in a store and compute operation in which the output store selection controls are provided to the file register access selectors 8B shown in FIG. 2.

Figure 4:
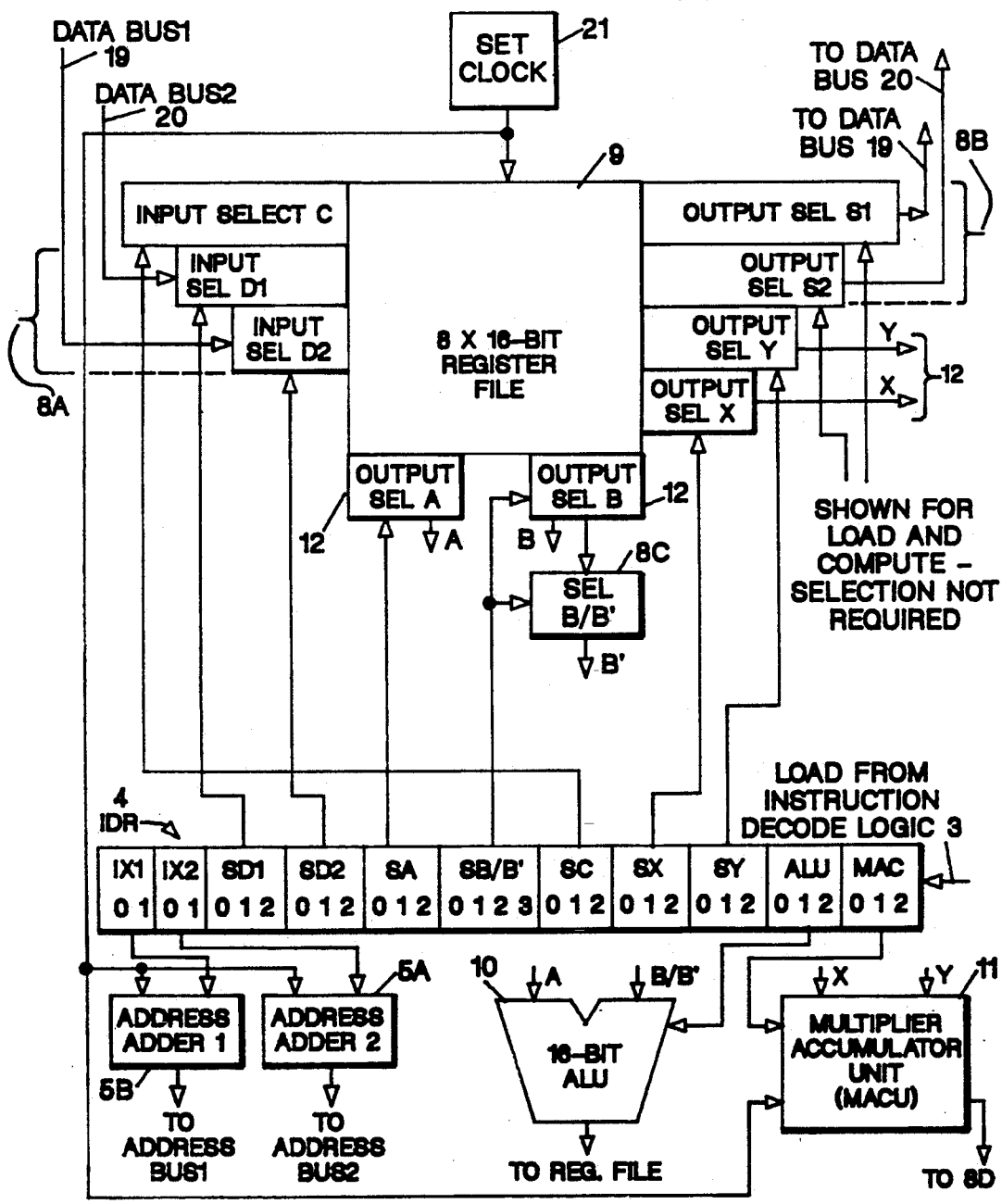
FIG. 4 shows the chief operational elements of an improved signal processor incorporating the register file and independent ALU and MACU units together with the control interconnections from the instruction decode logic and main system clocking signals.

FIG. 4 illustrates in somewhat greater detail the clocking and controls for operating the register file access control elements (8A, 8B, 8C, 12) under control of the IDR 4 and also shows the IDR 4 controlling the address generators 5A and 5B, the ALU 10 and the MACU 11. The clock 21 provides its clocking signals simultaneously as shown to all of the operative units including the register file 9, the address generators 5A and 5B, the MACU unit 11 and, though not shown, would also be supplied to set the accumulators 15A, 15B at the output of the MACU and to the instruction decode logic 3 which sets its output in the IDR 4.

The architectural layout of the elements as shown in FIGS. 1, 2 and 4 may be operated either in a pipelined or non-pipelined mode of operation.

Figure 5A:
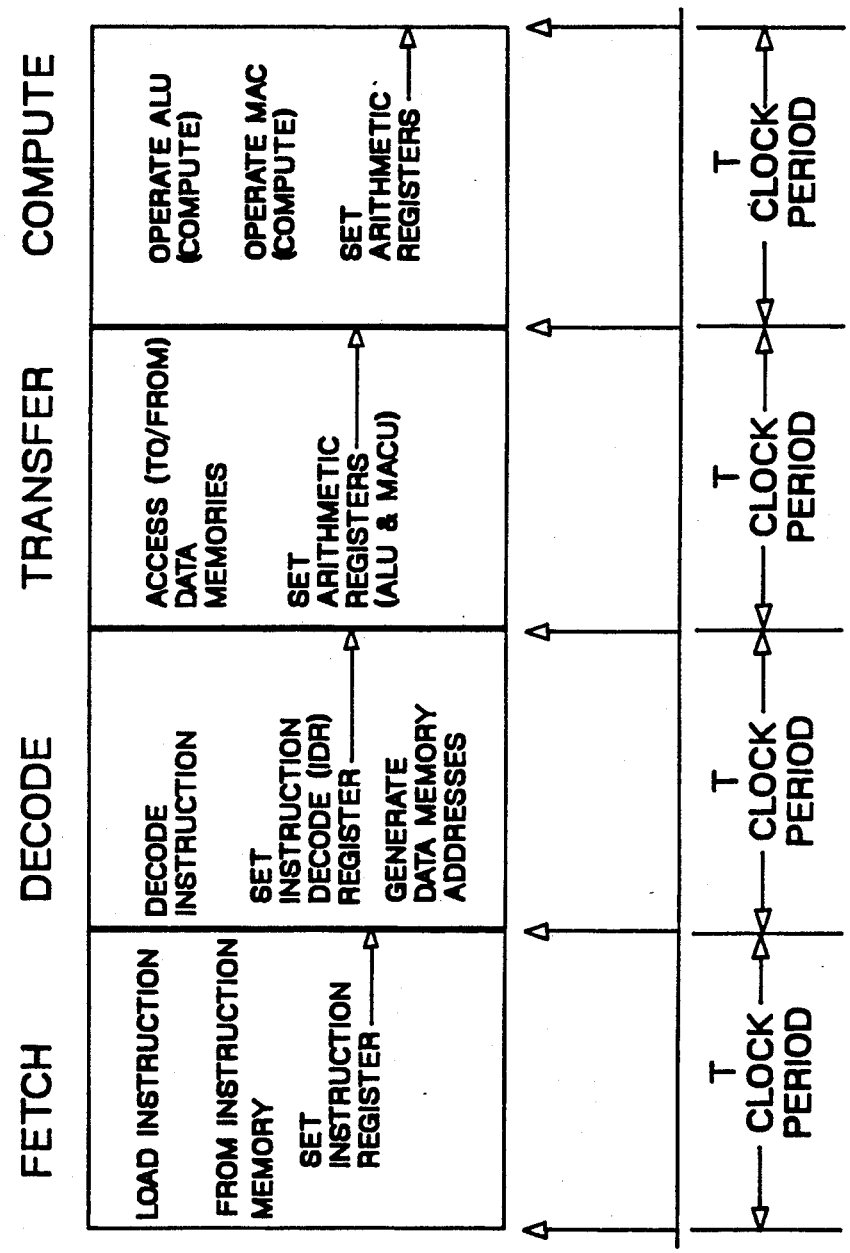
FIG. 5A illustrates schematically the timing of operation for the architecture of the instruction processor in the preferred embodiment in a non-pipelined configuration.

FIG. 5A illustrates the sequencing with the regularly occurring pulses from clock 21 for operation of the architecture in a non-pipelined operation including steps of "fetch an instruction", "decode an instruction", "transfer any data" necessary for executing the instruction and, finally, "computing or executing" the instruction. The timing of each operation is seen to be at the boundary which is the clock pulse ending a given clock period and beginning the next clock period.

Figure 5B:
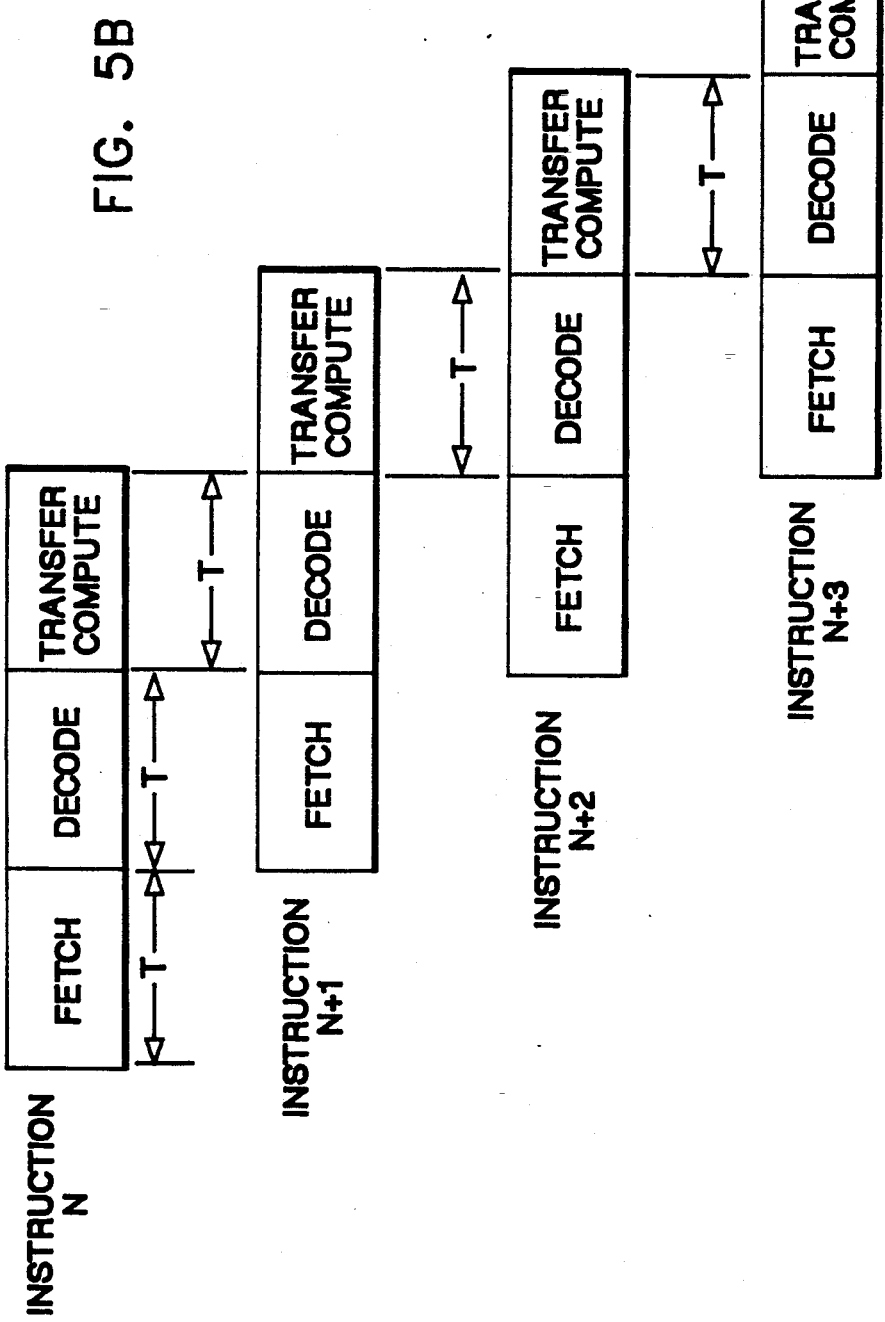
FIG. 5B illustrates schematically the clocking and sequencing for a three-phased pipelined mode of operation of the same architecture.

FIG. 5B illustrates the timing and sequencing for a three-phase pipelined mode of operation in which the data transfer and computation actions are taken in the same clock cycle for an instruction that has been decoded in the previous clock cycle and which was fetched on the clock cycle preceding that.

Register input and output selectors for the file register access control can be made of standard Texas Instrument part number 54ALS151 utilizing 16 eight-way selectors. FIG. 6 illustrates schematically the set of controls for what will be assumed to be an 8×16 array of file registers. The individual control fields of the IDR 4 are decoded in the decoders 22 A-N to operate through the gating logic to control setting of registers 1-8 in the register file 9 as schematically shown.

APPLICABILITY OF THE INVENTION

The described architecture and data flow in which the ALU and the MACU are separate and may be independently and simultaneously operated in the same clock cycle permits multiplication and accumulation of sums to be done independently of any operations going on in the ALU and vice versa. By permitting independent control of the ALU during such operations, a factor of at least two increase in throughput may be realized over that provided by many commonly used signal processing algorithms and machines. The data flow has several advantages in terms of implementation. First the ALU and register file are located in a single precision portion of the data flow while interfaced to the data buses is of the same word length. Only the adder and accumulator registers need to have double precision necessary for product accumulation and the output of the accumulators may be taken into the data flow as single precision operands (16 bit) instead of 32 bit double precision operands. The data flow architecture separates the less complex and high precision signal processing tasks such as product accumulation from the more complex control and microprocessor tasks performed by the ALU. The throughput gain for the data flow is achieved by operating the ALU independently while forming the sum of products separately in the MACU unit. This independent operation results in increased throughput for general operations and most obviously of the type exemplified by Equation A:

$$A(i)[B(j)+C(k)] \qquad \text{Eq. A.}$$

When sums of the type shown in Equation A are computed, the intermediate sum or difference is formed by the ALU and the sum of products is formed by the adder accumulator in the MACU.

Equations of the form A are useful in computing output of FIR filters having symmetrical impulse responses, which include the linear phase filters that have even symmetry and Hilbert filters that have odd symmetry. When computing filters of this type, the sum of equation in the form A produces an effective throughput of two filter taps per processor cycle.

Adding a second data memory and data bus to the architecture does not give a meaningful increase in throughput unless the ALU and MACU functions are made separately operable simultaneously.

Equations of the type or form shown in Equation A may use three operands per cycle to perform computations and are transferred by sharing the data buses through the register file as depicted herein. Since the two data memories are physically separated the transfers of data among them and the operation units requires two address pointers per bus, care must be taken in organizing the data arrays in the two memories. Typically, coefficients can be placed in one memory and data samples in the other. However, in the typical example of autocorrelation, two samples must be accessed per clock cycle from the same data array. In this case, the data is written in both memories. The organization of data may also be determined by whether the ALU overwrites one of its own operands when executing an operation. The organization of data in a memory is more easily done if the ALU can perform the operation $C = A + B$ as opposed to $A = A + B$. The latter function may require a reload of one of the operands, thereby increasing the overall transfer load and decreasing the throughput. The capabilities of processors constructed according to this architectural design are numerous as pointed out in the beginning here under the heading "Field of the Invention" and permit operation of the ALU and MACU independently and simultaneously to utilize the maximum transfer bandwidth of the dual data memory buses.

Numerous changes in implementation without departing from the spirit and scope of utilizing dual data bus memory architecture with separately and simultaneously operated MACU and ALU units in a signal processor will easily be suggested, wherefore what is desired to be protected by letters patent and what is claimed is set forth by way of example and not by way of limitation.

What is claimed is:

1. In a processor comprising a system clock, a random access register file, register file access control means, two independently operable random access data memories, an ALU, a MACU and two independently operable data buses connected with said register file access control means and with said two random access data memories, said MACU performing only multiplication and accumulation operations, the improvement for facilitating independent and simultaneous operation of said ALU and said MACU, characterized in that:

Said register file is connected to said data buses, to said MACU, and to said ALU through said register file access control means so that said data memories, said MACU and said ALU may simultaneously gain access to any register or registers in said register file; and all data transfers between said data memories and said ALU and said MACU is via placement of said data into said register file for access thereto by the intended recipient of said data, said MACU and said ALU having concurrent access to operands through said register file.

2. A processor as described in claim 1, further characterized in that:

said system clock supplies a single clock signal simultaneously to all of the clocked elements in said processor.

3. A processor as described in claim 2, further characterized in that:

said MACU has at least two independent accumulator register means connected in parallel and connected to receive the output results from the operation of said MACU.

4. A processor as described in claim 1 or claim 2 or claim 3, further comprising:

two independent data memory addressing control means for generating two independent data memory addresses.

5. A processor as described in claim 4, further characterized in that:

said data memory addressing control means each comprises at least two index registers and at least two displacement registers.

6. A processor as described in claim 1, further characterized in that:

said MACU has at least two independent accumulator register means connected in parallel and connected to receive the output results from the operation of said MACU.

7. A processor as described in claim 1, further comprising an instruction memory, an instruction memory address control sequencing means connected to said instruction memory, and an instruction decode logic means connected to said instruction memory to receive and decode instructions therefrom and further comprising an instruction decode output register (IDR) connected to said memory addressing control means, to said register file access control means, and to said ALU and to said MACU for controlling register selection of said register file for input or output of data and for controlling the functions of said ALU and of said MACU, characterized in that:

said IDR has separate register segments for holding decoded instructions, said separate register segments comprising at least two memory address control field segments, two register file data input selection control field segments, four register file output control field segments and at least one ALU function control field segment and at least one MACU control field segment and at least a functional control field segment for selecting the non-destructive retention of ALU result operands.

8. A processor as described in claim 7, wherein:

said IDR control field for said ALU specifies a selection of arithmetic controls of the form $a = b$ as a function of c where the arithmetic function specified by function includes at least addition and subtraction.

9. A processor as described in claim 7, wherein:

said IDR control field for said MACUs specifies a selection of arithmetic controls of the form Accuml = Accuml = a product p.

* * * * *